No. 884,618.
PATENTED APR. 14, 1908.
G. SCHUBERT.
CONVEYER.
APPLICATION FILED SEPT. 13, 1906.
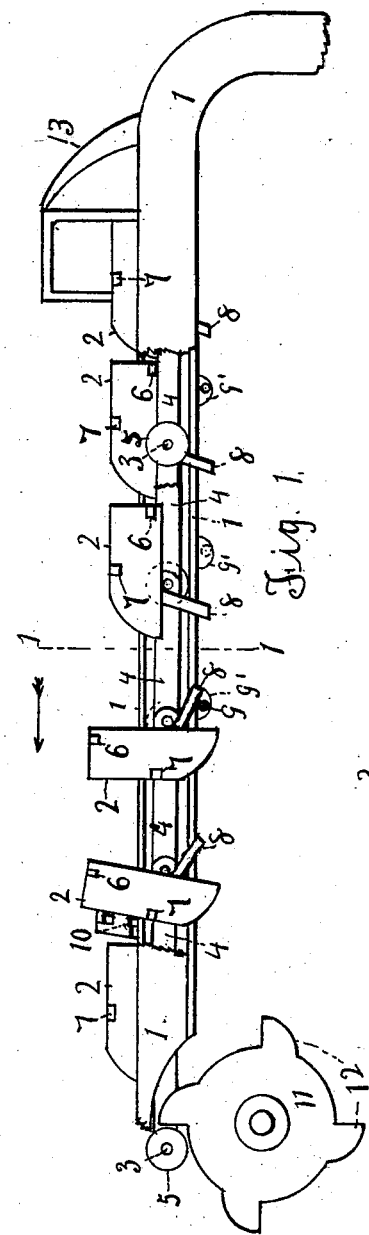
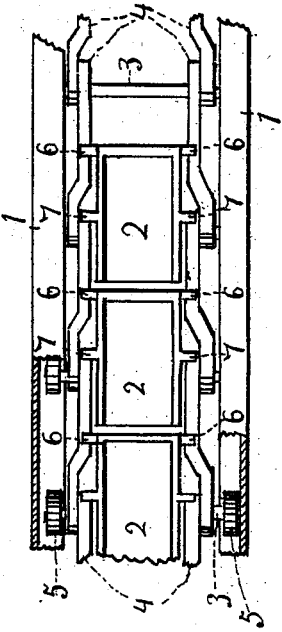
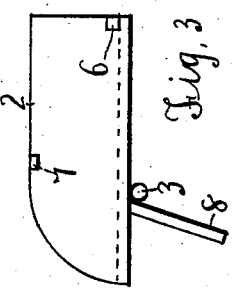
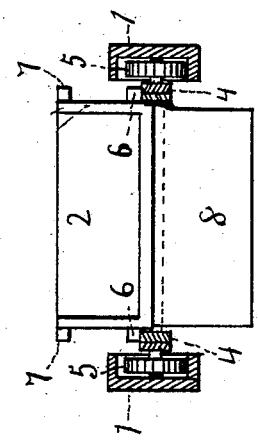
Witnesses
OT Averitt
John O. Williams
Inventor.
George Schubert

UNITED STATES PATENT OFFICE.

GEORGE SCHUBERT, OF FORT WORTH, TEXAS.

CONVEYER.

No. 884,618.  Specification of Letters Patent.  Patented April 14, 1908.

Application filed September 13, 1906. Serial No. 334,385.

*To all whom it may concern:*

Be it known that I, GEORGE SCHUBERT, a citizen of the United States, residing at Fort Worth, in the county of Tarrant and State of Texas, have invented a new and useful Conveyer, of which the following is a specification.

My present invention relates to improvement in a conveyer to convey grain or gravel &c. And my improvement consists in forming scoops or trucks, arranged on axles, said axles connected by links, and means on said trucks and on a track by which said trucks can be dumped, or emptied at any specified point of the track, and again automatically right themselves.

Figure 1 is a side view of a portion of a conveyer showing several trucks in their traveling position, and one in the act of dumping, and one in the act of righting itself. Fig. 2 is a top plan view of a section or portion of the conveyer with a portion of the upper portion of the track cut away to show parts beneath in full lines. Fig. 3 is a detail side view of one of the trucks enlarged, and Fig. 4, is an enlarged cross section, on line 1—1, Fig. 1, looking in opposite direction of arrow, and showing one of the trucks in full lines.

Referring to Fig. 1, 1, 1, represents the track, formed of channel bars, one on each side of the trucks, and secured to a building or structure, not shown. 2 represents the body of the trucks rigid on an axle 3, located forward of the center of the truck. 4, 4, are links one on each side of the trucks, connecting said axles 3, in single file. 5, 5, are wheels or travelers journaled on the projecting ends of said axles, in position to travel in the channel tracks 1, 1. 6, 6, are lugs projecting sidewise from near the lower and rear end of said trucks, one on each side in position to rest on the links 4, 4, when the trucks are in their normal position. 7, 7, are similar lugs, projecting sidewise on each side of said trucks and located on the upper edge of said trucks and near the center of the length of said trucks.

8 is a downward and forward projecting spur extending from the axle 3, to some distance below the track.

9 represents a pin or bar secured on the under side of the tracks 1, 1.

10 represents a lug secured on the upper side of the track 1, 1.

11, represents the usual drive-wheel, having the sprockets 12, to engage the wheels 5, 5, The track 1, 1, being cut away to clear said sprockets 12.

13 is a spout of an elevator to fill the trucks 2, as the said trucks pass beneath said elevator.

As the conveyer moves in the direction of the arrow, the truck 2 being filled by the elevator 13, (suitably located,) the filled trucks move along until the spur 8 engages the pin 9, located in any one of the lugs 7. The said spur 8 being detained by said pin causes the rear end of the truck to turn up and dump the load down between the tracks, the forward end of the trucks being formed open to admit of the freight shifting from said truck with ease. The lugs 7, 7, engage the links 4, 4, and limit the forward turn of said trucks. As the conveyer continues on its forward movement, the body of the trucks coming in contact with the lug 10, are shifted down and in to their normal position.

I am aware that prior to my invention conveyers have been made to dump their load at any specified place, I therefore do not claim such a combination broadly; but

I claim:

1. In a conveyer, of the kind described trucks rigid on their axles, links connecting said axles, lugs on the rear end of said trucks resting on said links, in the carrying position of its trucks for the purpose described.

2. In a conveyer, of the kind described, trucks rigid on their axles, links connecting said axles, downward and forward projecting lugs on said trucks, rods projecting from the track to be engaged by said lugs, for the purpose described.

GEORGE SCHUBERT.

Witnesses:
O. T. AVERITT,
JOHN A. WILLIAMS.